March 10, 1936.  S. ARTON  2,033,604
RING SUNDIAL
Filed Aug. 12, 1935
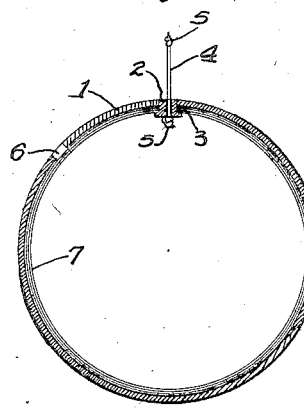
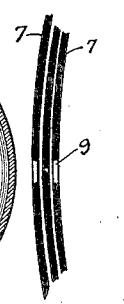
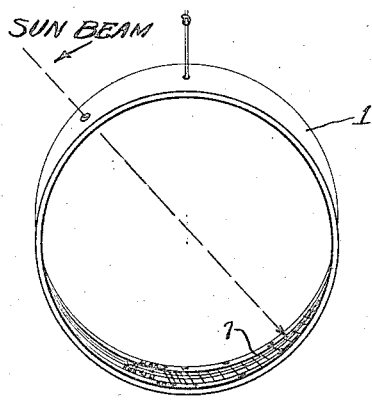
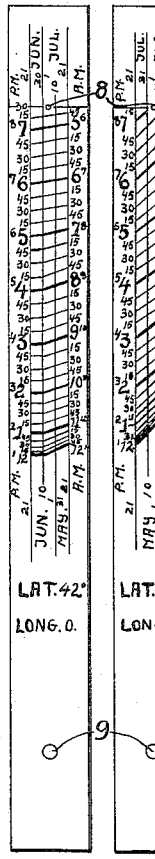
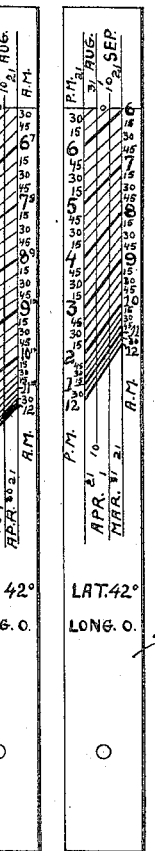
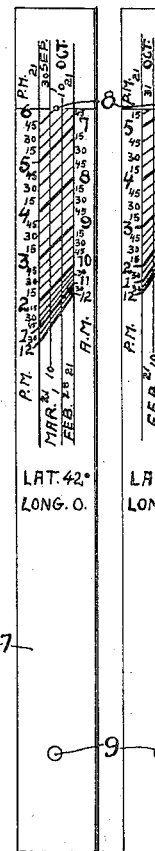
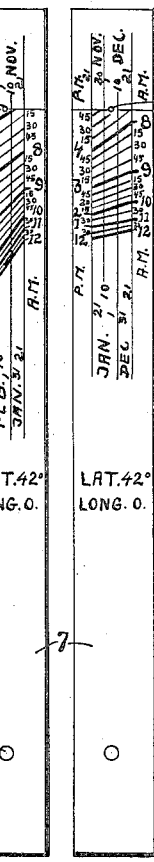
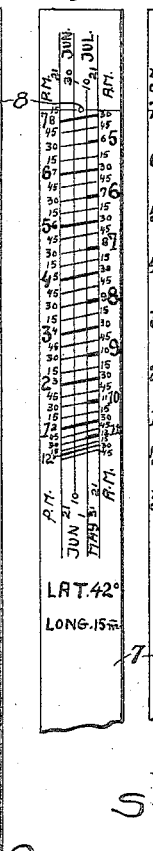
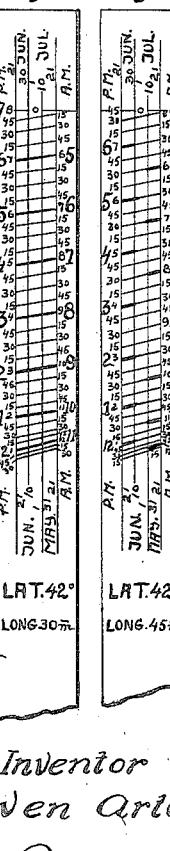
Inventor
Sven Arton Patented Mar. 10, 1936

2,033,604

UNITED STATES PATENT OFFICE 2,033,604

RING SUNDIAL

Sven Arton, Chicago, Ill.

Application August 12, 1935, Serial No. 35,894

3 Claims. (Cl. 33—62)

This invention relates to a very simple device for indicating time by the angular position of the image of the sun formed through a pinhole.

The main objects of this invention are to provide an inexpensive construction provided with time charts on which the image of the sun indicates approximately clock time; to provide a simple circular band or sun ring suspended by a cord, which establishes by gravity a horizontal plane parallel with the earth's surface; to provide a pinhole in a band capable of forming a visible image of the sun; to provide a time chart graduated to indicate the time of day; to provide interchangeable scales detachably secured to the inner surface of a circular band; to provide compensating time charts for the variable velocity of the earth and its inclination at different periods; to provide time charts for a predetermined latitude and longitude, and to provide a construction which may be made of waterproof material and may be carried as a watch.

An illustrative embodiment of this invention is shown in the accompanying drawing, in which Figure 1 is a sectional view taken on the line 1—1 of Fig. 2 of my improved sun ring showing a bushing riveted to the ring; and provided with an aperture; and also showing a suspension string.

Fig. 2 is a side view of the same.

Fig. 3 is a perspective view of the same showing the position of the sun's image.

Fig. 4 is a magnified edge view of time charts showing the position of the pinhole.

Fig. 5 is a face view of chart No. 1 which has been previously prepared to indicate time by the position of the image of the sun and calibrated to read for latitude 42, longitude zero, from May 21st to July 21st of any year.

Fig. 6 is the opposite side of the chart shown in Fig. 5, and calibrated for latitude 42, longitude zero, from April 21st to May 21st and from July 21st to August 21st.

Fig. 7 is a face view of chart No. 2 calibrated to read for latitude 42, longitude zero, from May 21st to April 21st and from August 21st to September 21st.

Fig. 8 is a face view of the opposite side of the chart shown in Fig. 6 and calibrated to read for latitude 42 and longitude zero from February 21st to March 21st and from September 21st to October 21st.

Fig. 9 is a face view of chart No. 3 and calibrated to read for latitude 42, longitude zero from January 21st to February 21st and from October 21st to November 21st.

Fig. 10 is a face view of the opposite side of the chart shown in Fig. 8 and calibrated to read for latitude 42 and longitude zero from December 21st to January 21st and from November 21st to December 21st.

Fig. 11 is a face view of a chart, similar to chart No. 1, but calibrated to read for latitude 42, longitude 15 min. from May 21st to July 21st.

Fig. 12 is a face view of a chart similar to that of Fig. 11, but calibrated to read for latitude 42, longitude 30 min. from May 21st to July 21st.

Fig. 13 is a face view of a chart similar to that of Figs. 11 and 12, but calibrated to read for latitude 42, longitude 45 min. from May 21st to July 21st.

Referring to the specific embodiment shown in the drawing, the ring sundial shown therein comprises a circular band or frame 1 preferably constructed of aluminum or the like. A bushing 2 having a shoulder 3 is secured to the frame 1 through which a suspension means comprising a string or the like 4 is secured by knotting the same at both ends, as shown at 5. At approximately 45 degrees from the bushing 2 a symmetrically placed aperture 6 is provided in the ring 1.

Charts 7, Figs. 5 to 10, of predetermined length and width are adapted to be placed on the inner wall of the frame 1 in such manner that the charts are held in position by being sprung into place, with their ends abutting the bushing 2, as shown in Fig. 1. The insertion of these slips, which have six printed sides, each being indicative of two months of the year, completes the ring sundial for use for an entire year. It will therefore be apparent that the ring sundial may be used continuously for any predetermined latitude and longitude. Each of the charts 7 is provided with a pinhole aperture 8 located adjacent the upper end of the slip as shown in Figs. 5 to 10 at a distance from the end of the chart which is equal to the distance from the bushing 2 to the center of the aperture 6 in the frame 1. At an equal distance from the lower end of the chart 7 an aperture 9 is provided of the same diameter as the diameter of the aperture in the frame 1.

Assuming that the three charts are in position as shown in Fig. 1, in order to read the time, the chart for the current month must be visible. The charts are removed from the frame 1 by lifting the charts upwardly at a point near the bushing 2. The chart calibrated for the current month is then selected and placed so that the graduations will be visible as shown in Fig. 3.

Place the center slip so that the pinhole aperture 8 is between the apertures 9 in the other two charts, and the three charts are then replaced in the band 1 as shown in Fig. 3. The apparatus is then ready for use.

The sun ring is then suspended by the string 4, with the aperture 6 facing the sun. The force of gravity establishes the horizon through the center of the sun ring, and the position of the image of the sun in the shadow of the ring gives the angle of the sun above the horizon. The charts 7 are calibrated from either observation or by calculation, since the relation between time and the angle of the sun for every day is fixed. It will be apparent that the time chart may be made to read mean solar time or any variation derived therefrom. The accuracy of the reading depends on the sharpness of the sun's image and the size of the charts.

In my time charts the vertical or long lines shown thereon are the date lines. Each chart begins with the 21st of the given month and ends with the 21st of the following month. The first six months of the year are read from the lower end of each chart and the last six months from the upper end. The date lines are spaced ten days apart and readings for intermediate days of each month must be estimated and read between the vertical date lines. The hours and minutes are indicated on these charts by the horizontal or cross lines. With a little practice the sun's image can be focused on the date line very accurately and the time can be read with a probable error of not more than five minutes. The morning graduations are so placed on the slips that they are nearest the observer's eye when the sun ring is held in the right hand. For afternoon readings the ring is preferably held in the left hand, making the afternoon graduations more easily read, being on the opposite side of the morning graduations.

As will be apparent from the drawing, the morning readings appear on the right hand side of the chart and read downwardly, and the afternoon readings appear on the left hand side of the chart and read upwardly.

It will be apparent that since this time indicating device depends upon the relation between time and the elevation of the sun, that the time charts must be prepared in advance for use at some known latitude and longitude. This entire device may be made of waterproof material and also constructed so that it may be carried as a watch.

Although but one specific embodiment of this invention has been herein shown and described, it will be understood that details of the construction shown may be altered or omitted without departing from the spirit of this invention as defined by the following claims.

I claim:

1. In a ring sundial, a frame, means for suspending said frame, and a plurality of calibrated time charts detachably secured in said frame, said charts and frame each being provided with cooperating apertures adapted to permit the entrance of light therethrough and focus the same on one of said charts.

2. In a ring sundial, a frame provided with an aperture, means for suspending said frame, a plurality of calibrated time charts detachably secured in said frame, each of said charts being provided with a pinhole aperture and a larger aperture in its remote ends, the pinhole aperture in one of said charts and the larger apertures in the other of said charts being in registry with each other and the aperture in said frame to focus the image of the sun on one of said charts when exposed thereto.

3. In a ring sundial, a frame provided with an aperture means for suspending said frame, a plurality of calibrated time charts detachably secured in said frame, the aperture in said frame being spaced angularly at 45 degrees relative to the point of suspension on said frame, each of said charts being provided with a pinhole aperture and a larger aperture in its remote end, the pinhole aperture in one of said charts and the larger apertures in the other of said charts being in registry with each other and the aperture in said frame to focus the image of the sun on one of said charts when exposed thereto.

SVEN ARTON.